United States Patent
Clark et al.

(10) Patent No.: US 9,571,303 B2
(45) Date of Patent: Feb. 14, 2017

(54) METHOD, SYSTEM AND APPARATUS FOR HANDLING A REQUEST FOR A MEDIA-OVER-PACKET COMMUNICATION SESSION

(75) Inventors: David William Clark, Carp (CA); Jonathan Allan Arsenault, Orleans (CA); Jeffrey William Dawson, Stittsville (CA); Eric John Wolf, Stittsville (CA)

(73) Assignee: BCE INC., Montreal, Quebec (CA)

( * ) Notice: Subject to any disclaimer, the term of this patent is extended or adjusted under 35 U.S.C. 154(b) by 673 days.

(21) Appl. No.: 11/993,429

(22) PCT Filed: Dec. 19, 2006

(86) PCT No.: PCT/CA2006/002074
§ 371 (c)(1),
(2), (4) Date: Dec. 20, 2007

(87) PCT Pub. No.: WO2008/074120
PCT Pub. Date: Jun. 26, 2008

(65) Prior Publication Data
US 2010/0114896 A1    May 6, 2010

(51) Int. Cl.
*G06F 15/16* (2006.01)
*H04L 12/66* (2006.01)
(Continued)

(52) U.S. Cl.
CPC ........... *H04L 12/66* (2013.01); *H04M 3/54* (2013.01); *H04M 7/0075* (2013.01);
(Continued)

(58) Field of Classification Search
USPC .......... 379/211.02, 88.11, 88.25; 455/435.1; 707/104.1; 370/331
See application file for complete search history.

(56) References Cited

U.S. PATENT DOCUMENTS

| 4,935,955 A | 6/1990 | Neudorfer |
| 5,999,965 A | 12/1999 | Kelly |

(Continued)

FOREIGN PATENT DOCUMENTS

| EP | 0 641 112 A2 | 3/1995 |
| WO | WO 02/056568 A2 | 7/2002 |

(Continued)

OTHER PUBLICATIONS

Office Action issued on Feb. 2, 2012 in connection with U.S. Appl. No. 11/993,616, 33 pages.
(Continued)

*Primary Examiner* — Aftab N. Khan
(74) *Attorney, Agent, or Firm* — Gowling WLG (Canada) LLP

(57) ABSTRACT

Embodiments of the present invention are directed to a method, system and apparatus handling a request for a media-over-packet communication session. The method comprises receiving a request for a media-over-packet communication session destined for a network address. Responsive to determining existence of an active communication session with a first communication client registered to the network address, the method further comprises determining an identifier associated with a second communication client registered to the network address, the second communication client different from the first communication client; and routing the request to the second communication client using the identifier.

50 Claims, 6 Drawing Sheets

(51) Int. Cl.
*H04W 76/00* (2009.01)
*H04M 3/54* (2006.01)
*H04M 7/00* (2006.01)
*H04W 60/00* (2009.01)

(52) U.S. Cl.
CPC ..... *H04W 76/00* (2013.01); *G06F 2209/5016* (2013.01); *H04W 60/005* (2013.01)

(56) References Cited

U.S. PATENT DOCUMENTS

| | | | |
|---|---|---|---|
| 6,473,501 | B1 | 10/2002 | Paulsrud |
| 7,369,538 | B1* | 5/2008 | Ehlinger et al. ............... 370/352 |
| 7,496,625 | B1* | 2/2009 | Belcher et al. ................ 709/204 |
| 7,822,188 | B1* | 10/2010 | Kirchhoff et al. ....... 379/211.02 |
| 7,881,455 | B2 | 2/2011 | Wolter et al. |
| 2003/0041048 | A1 | 2/2003 | Balasuriya |
| 2003/0048892 | A1 | 3/2003 | Murai |
| 2003/0179743 | A1* | 9/2003 | Bosik et al. ................... 370/352 |
| 2003/0194078 | A1* | 10/2003 | Wood et al. ................... 379/224 |
| 2004/0233892 | A1 | 11/2004 | Roberts et al. |
| 2005/0259667 | A1 | 11/2005 | Vinokurov et al. |
| 2007/0064886 | A1* | 3/2007 | Chiu et al. ................. 379/88.17 |
| 2007/0079005 | A1* | 4/2007 | Jasen et al. ................... 709/240 |
| 2007/0243870 | A1* | 10/2007 | Bantukul ................... 455/435.1 |
| 2007/0282911 | A1* | 12/2007 | Bantukul et al. .......... 707/104.1 |
| 2007/0286202 | A1* | 12/2007 | Dos Remedios et al. . 370/395.2 |
| 2007/0286391 | A1 | 12/2007 | Gibson |
| 2008/0253543 | A1* | 10/2008 | Aharon ................... 379/201.12 |
| 2009/0097626 | A1* | 4/2009 | McMurry et al. ........ 379/201.01 |
| 2009/0103519 | A1* | 4/2009 | Grothe .......................... 370/352 |
| 2011/0255671 | A1* | 10/2011 | Madhavapeddi et al. . 379/88.01 |
| 2012/0195305 | A1* | 8/2012 | Chavda et al. ............... 370/352 |
| 2013/0229950 | A1* | 9/2013 | Bjorsell et al. ............... 370/259 |

FOREIGN PATENT DOCUMENTS

| | | |
|---|---|---|
| WO | WO 2004/031902 A2 | 4/2004 |
| WO | WO 2004/066604 A1 | 8/2004 |
| WO | PCT/CA2006/002072 | 8/2007 |
| WO | PCT/CA2006/002074 | 8/2007 |

OTHER PUBLICATIONS

Office Action issued on Sep. 6, 2012 in connection with U.S. Appl. No. 11/993,616, 31 pages.

Office Action issued on Sep. 12, 2013 in connection with U.S. Appl. No. 11/993,616, 28 pages.

* cited by examiner

METHOD, SYSTEM AND APPARATUS FOR HANDLING A REQUEST FOR A MEDIA-OVER-PACKET COMMUNICATION SESSION

FIELD OF THE INVENTION

This invention relates to the field of telecommunications in general and, more specifically, to a method, system and apparatus for handling a request for a media-over-packet communication session.

BACKGROUND OF THE INVENTION

A typical telephony subscriber installs a plurality of telephones in his or her household. For example, s/he may install telephones in various rooms of the household to enable easy reach of the telephone in the case s/he or other dwellers need to answer an incoming call or need to make an outgoing call irrespective of their location within the household. At the same time, these telephones are all associated with a single telephone number and a single telephone line that the subscriber subscribes to and pays for. In this scenario, if one user in the particular household is engaged in an active telephony session using one of the plurality of telephones installed in the household and, if a second incoming call is placed to the household telephone number, in the absence of any special telephony features provisioned in association with the household telephone number, the second incoming call can not be completed and the initiator of the second incoming call will likely get a busy signal or will be connected to a voice mail system.

One existing solution for managing the second incoming call is a feature commonly referred to as "call waiting". Generally speaking, call waiting works in the following manner. If a calling party places a call to a called party which is otherwise engaged, and the called party has the call waiting feature enabled, the called party is able to suspend the current telephone call and switch to the new incoming call, and can then decide which of the two calls to continue with. The main drawback of the call waiting feature is that it only announces the second incoming call to the user who is currently engaged on the active telephony session and it is up to that user to determine how to dispose of the active communication session and the second incoming call.

There is a need in the art for a more flexible method for handling an incoming call, the incoming call destined for a particular telephone number, when an active communication session with the particular telephone number is in progress.

SUMMARY OF THE INVENTION

According to a first broad aspect of the present invention, there is provided a method. The method comprises receiving a request for a media-over-packet communication session destined for a network address. The method further comprises responsive to determining existence of an active communication session with a first communication client registered to the network address. The method further comprises determining an identifier associated with a second communication client registered to the network address, the second communication client different from the first communication client and routing the request to the second communication client using the identifier.

According to a second broad aspect of the present invention, there is provided a network element. The network element comprises means for receiving a request for a media-over-packet communication session destined for a network address. The network element further comprises means for determining existence of an active communication session with a first communication client registered to the network address and means for determining an identifier associated with a second communication client registered to the network address, the second communication client different from the first communication client. The network element further comprises means for routing the request to the second communication client using the identifier, wherein the means for determining an identifier and the means for routing are responsive to at least a determination that there does exist the active communication.

According to a third broad aspect of the present invention, there is provided a system. The system comprises a network element connectable to a plurality of communication clients over a communication network, the network element being operable to receive a request for a media-over-packet communication session destined for a network address. The network element is further operable, responsive to determining existence of an active communication session with a first communication client registered to the network address:
  to determine an identifier associated with a second communication client registered to the network address, the second communication client different from the first communication client;
  to route the request to the second communication client using the identifier.

According to yet another broad aspect of the present invention, there is provided a computer-readable medium comprising computer-readable program code which, when executed by a computing apparatus, causes the computing apparatus:
  to receive a request for a media-over-packet communication session destined for a network address;
  responsive to determining existence of an active communication session with a first communication client registered to the network address:
    to determine an identifier associated with a second communication client registered to the network address, the second communication client different from the first communication client;
    to route the request to the second communication client using the identifier.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
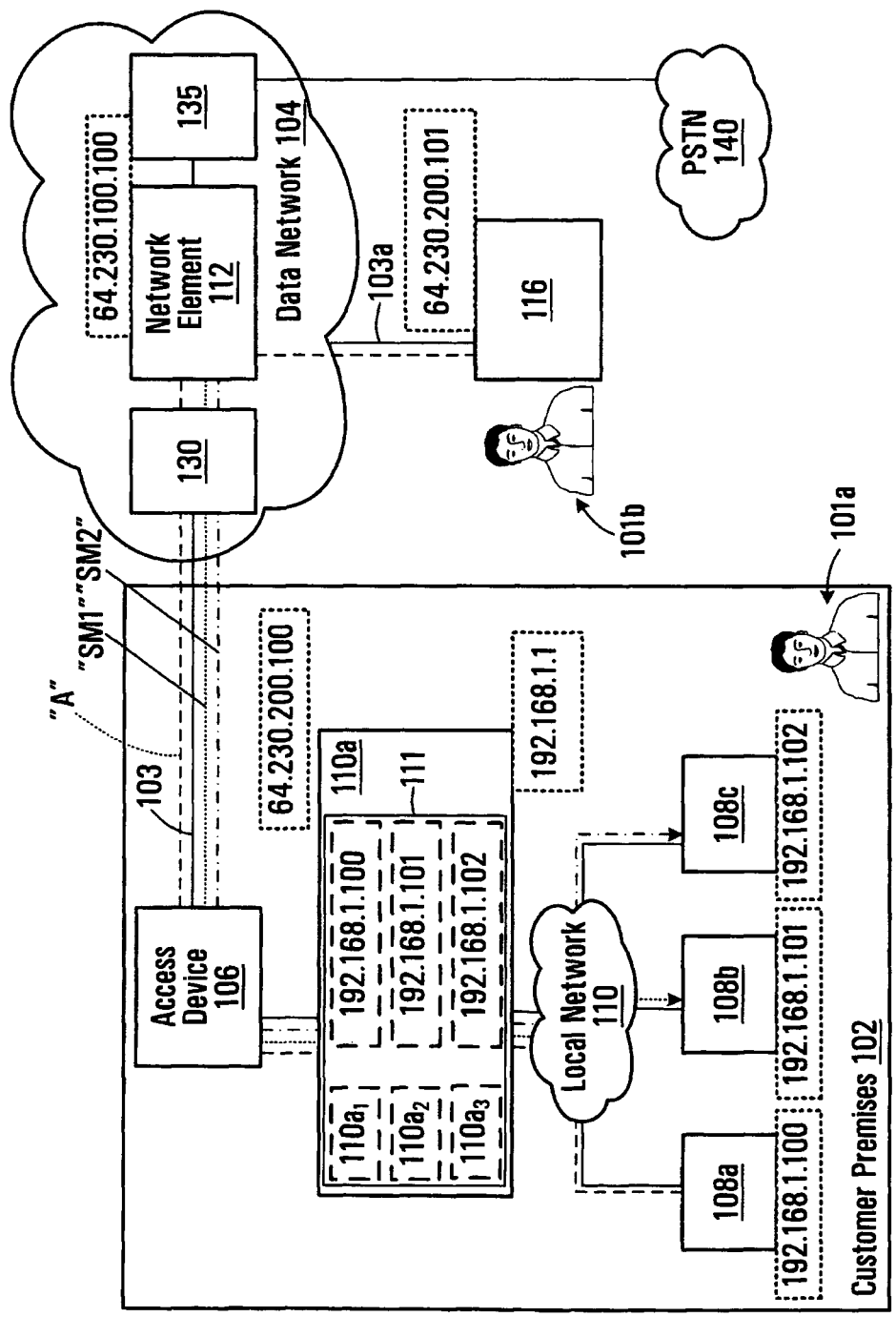
FIG. 1 is a diagram representing various components of a non-limiting embodiment of an infrastructure for handling a request for a media-over-packet communication session.

FIG. 1 shows various components of an infrastructure for handling a request for a media-over-packet communication session. The infrastructure comprises a customer premises 102 associated with a user 101a. The customer premises 102 can be coupled to a data network 104 via an access connection 103. The customer premises 102 may comprise, but is not limited to, a house, a unit in a multi-dwelling unit (MDU), an office, etc. The data network 104 may comprise any data network suitable for satisfying communication needs of user(s) at the customer premises 102 (such as, for example, the user 101a). These communication needs may include exchanging data, entertainment, telephony and the like. In a specific non-limiting embodiment of the present invention, the data network 104 can comprise the Internet. However, in alternative non-limiting embodiments of the present invention, the data network 104 may comprise another type of a public data network, a private data network, portions of the Public Switched Telephone Network (PSTN), a wireless data network and the like.

In an example non-limiting embodiment of the present invention, the access connection 103 can be a copper twisted pair, over which higher-layer protocols allow for the exchange of packets (ex. an xDSL-based access link). In an alternative non-limiting embodiment, the access connection 103 may comprise an Ethernet link, a fiber optic link (e.g., Fiber-to-the-Premise, Fiber-to-the-Curb, etc.), a wireless link (e.g., EV-DO, WiMax, WiFi, CDMA, TDMA, GSM, UMTS, and the like), coaxial cable link, etc., or a combination thereof. Generally speaking, the access connection 103 may comprise any type of wireless, wired or optical connection that allows exchange of data between the customer premises 102 and the data network 104.

It should be noted that even though its depiction in FIG. 1 is greatly simplified, the data network 104 may comprise a number of network elements for facilitating exchange of data. For example, in the above-mentioned scenario where the access connection 103 is the xDSL-based link, the data network 104 may comprise a number of Digital Subscriber Line Access Multiplexers (DSLAMs), Outside Plant Interface DSLAMs (OPI-DSLAMs), edge routers, etc. In the above-mentioned scenario where the access connection 103 is the cable link, the data network 104 may comprise a number of cable headends, distribution hubs, etc. As a non-limiting example of these network elements, a DSLAM 130 has been depicted in FIG. 1. Persons skilled in the art will readily appreciate various configurations possible for the network elements that make up the data network 104 and, as such, these network elements need not be described here in great detail.

The customer premises 102 may comprise an access device 106 that facilitates exchange of data with the data network 104 via the access connection 103. In some embodiments of the present invention, the access device 106 may comprise a modem. Examples of modems that can be used include, but are not limited to, a cable modem, an xDSL modem and the like. In alternative embodiments of the present invention, which are particularly applicable where the access connection 103 comprises Fiber-to-the-premise, the access device 106 may comprise an Optical Network Terminal (ONT). Naturally, the type of the access device 106 will depend on the type of the access connection 103 employed.

The customer premises 102 may comprise a number of communication clients coupled to the access device 106. Only three communication clients are depicted: a communication client 108a, a communication client 108b and a communication client 108c. Generally speaking, communication clients 108a, 108b and 108c can be implemented in hardware, software, firmware or a combination thereof. In a specific non-limiting example, the communication client 108a may comprise a VoIP phone, the communication client 108b may comprise a second VoIP phone and the communication client 108c may comprise a computing apparatus executing a soft client for handling media-over-packet calls. It should be understood that the customer premises 102 may comprise a number of additional communication clients that may include, but are not limited to, other VoIP phones, a wireless VoIP phone (such as, for example, a J2ME wireless phone), a Plain Old Telephone System (POTS) phone equipped with an Analog Terminal Adapter (ATA), other computing apparatuses executing soft clients, a set-top box, a gaming device, a security system and the like. The number of communication clients installed within the customer premises 102 is not limited other than by business considerations of a service provider who manages the access connection 103. Put another way, the customer premises 102 may comprise two or more communication clients similar to the communication clients 108a, 108b, 108c.

In some embodiments of the present invention, the communication clients 108a, 108b and 108c may be coupled directly to the access device 106. However, in the specific non-limiting embodiment depicted in FIG. 1, the communication clients 108a, 108b and 108c are coupled to the access device 106 via a local data network 110. In some non-limiting embodiments of the present invention, the local data network 110 may comprise an Ethernet-based network. In another non-limiting embodiment of the present invention, the local data network 110 may comprise a wireless network (ex. a Wi-Fi based network, a Wi-Max based network, BlueTooth® based network and the like). It should be noted that any other type of local data network 110 or a combination of the example networks can be used. In some of these embodiments, the local data network 110 may comprise a home gateway 110a that mediates communication between the communication clients 108a, 108b and 108c and the access device 106. The home gateway 110a may comprise a wireless router, a wired router or a combined wireless/wired router.

In some non-limiting embodiments of the present invention, the functionality of the access device 106 and the home gateway 110a may be embodied in a single device. In other non-limiting embodiments of the present invention, the functionality of the access device 106 and/or the home gateway 110a may be integrated into one of the communication clients 108a, 108b, 108c. In yet further alternative non-limiting embodiments of the present invention, the home gateway 110a and the local data network 110 can be omitted from the infrastructure of FIG. 1. This is particularly applicable in those non-limiting embodiments where the communication clients 108a, 108b or 108c are coupled to the access device 106 directly and, as such, the local data network 110 and the home gateway 110a can be omitted. Yet in other alternative non-limiting embodiments of the present invention, some of the communication clients 108a, 108b and 108c (as well as other communication clients potentially located within the customer premises 102, but omitted from the infrastructure of FIG. 1 for the sake of simplicity) may be coupled directly to the access device 106, while others of the communication clients 108a, 108b and 108c (as well as other communication clients potentially located within the customer premises 102, but omitted from the infrastructure of FIG. 1 for the sake of simplicity) may be coupled to the access device 106 via the local data network 110 and the home gateway 110a.

It should be understood that the infrastructure of FIG. 1 may comprise a number of additional communication clients outside of the customer premises 102, coupled to the data network 104. As a non-limiting example only, the infrastructure of FIG. 1 may comprise a communication client 116 associated with another user (such as, for example, a user 101b). The communication client 116 can be coupled to the data network 104 via an access connection 103a. The communication client 116 may comprise one or more of a VoIP phone, a POTS phone equipped with an Analog Terminal Adapter (ATA), a computing apparatus executing a soft client, a set-top box, a gaming device, a security system and the like. The access connection 103a may be substantially similar to the access connection 103. However, it should be understood that the access connection 103 and the access connection 103a need not be of the same type in every embodiment of the present invention. For example, in some non-limiting embodiments of the present invention, the access connection 103 may comprise an xDSL-based link, while the access connection 103a may comprise a Fiber-to-the-Premise based link. Naturally, a myriad of other non-limiting combinations of how the access connections 103, 103a can be implemented are possible.

For the purposes of establishing communication sessions and terminating communication sessions between, for example, one of the communication clients 108a, 108b, 108c and another communication client (such as, for example, the communication client 116) via the data network 104, the data network 104 may comprise a network element 112. The network element 112 is sometimes referred to in the industry as a "soft switch" and comprises circuitry, software and/or control logic for providing various communication features to communication clients (such as, for example, the communication clients 108a, 108b, 108c and 116) coupled to the data network 104. Examples of such communication features include (i) connecting incoming calls to the communication clients (such as, for example, the communication clients 108a, 108b, 108c and 116); and (ii) handling outgoing calls originated from the communication clients (such as, for example, the communication clients 108a, 108b, 108c and 116). Other examples of communication features that can be performed by the network element 112 can include but are not limited to call waiting, call forwarding, and so on.

In some embodiments of the present invention, the network element 112 may further comprise circuitry, software and/or control logic for performing at least one of the following functions: synthesizing voice messages, providing audio mixing capabilities, receiving a selection from users of communication clients, receiving and interpreting speech utterances, detecting DTMF tones, determining the current time and the like. In an alternative non-limiting embodiment of the present invention, some or all of these additional functions may be performed by one or more devices (not depicted) connected to and under control of the network element 112. Furthermore, among other functions performed by the network element 112, the network element 112 can maintain or have access to an active call table (not depicted) which logs all active communication sessions maintained by all communication clients registered to the network element 112 (such as, for example, the communication clients 108a, 108b, 108c and 116).

In addition, the network element 112 can comprise suitable circuitry, software and/or control logic for exchanging calls with entities outside the data network 104. This is particularly convenient, when a call is placed by the user of one of the communication clients that the network element 112 serves (i.e. a user 101a of one of the communication clients 108a, 108b, and 108c or the user 101b of the communication client 116) to a telephone number that is reachable only via the Public Switched Telephone Network (PSTN), which is depicted at 140 in FIG. 1, and vice versa. In an alternative non-limiting embodiment of the present invention, the infrastructure of FIG. 1 may comprise a separate gateway 135 for mediating the communication flow between the data network 104 and the PSTN 140.

A non-limiting example of the network element 112 can be embodied in a MCS 5200 Soft Switch manufactured by Nortel Networks Ltd. of 8200 Dixie Road, Brampton, Ontario L6T 5P6, Canada. However, it should be expressly understood that the network element 112 can have various other configurations.

For the purposes of facilitating exchange of data via the data network 104, the home gateway 110a may be assigned a network address compatible with an addressing scheme of the data network 104. In some embodiments of the present inventions, the network address can comprise an IPv4 address. In an alternative embodiment of the present invention, the network address can comprise an IPv6 address. In an alternative non-limiting embodiment of the present invention, the network address can comprise any other suitable type of a unique identifier, such as, for example, a media access control (MAC) address, a URL, a proprietary identifier and the like.

How the home gateway 110a is assigned the network address is not particularly limited. For example, in some non-limiting embodiments of the present invention, the home gateway 110a may be assigned a static network address. This static network address may be assigned to the home gateway 110a before the home gateway 110a is shipped to the customer premises 102, during an initial registration process or at another suitable time. In another non-limiting embodiment of the present invention, the home gateway 110a may be assigned a dynamic network address. For example, in a non-limiting scenario, a Dynamic Host Configuration Protocol (DHCP) server (not depicted) may be used to assign the dynamic network address (such as, for example, a dynamic IP address) to the home gateway 110a. In alternative non-limiting embodiments of the present invention, the home gateway 110a can obtain its network address by establishing a PPPoE session with a provisioning server (not depicted). Other alternative implementations are, of course, possible. In an alternative non-limiting embodiment of the present invention, which is particularly applicable in a scenario where the home gateway 110a is omitted, the access device 106 may be assigned a network address.

Each of the communication clients 108a, 108b and 108c can also be assigned a respective network address for the purposes of receiving and transmitting data via the home gateway 110a, the access device 106 and the data network 104. Several non-limiting embodiments as to how the network addresses of the communication clients 108a, 108b and 108c can be assigned are envisioned:

Public Network Addresses

In some embodiments of the present invention, the communication clients 108a, 108b and 108c can be assigned network addresses that are routable or, in other words, are visible to the data network 104 and other devices connected thereto (such as, for example, the network element 112, the communication client 116). The routable network addresses are sometimes also referred to as "global" or "public" network addresses. For example, if the data network 104 implements an IPv6 address scheme, it is envisioned that each of the communication clients 108a, 108b and 108c may be assigned a unique public IP address. In some of these non-limiting embodiments, there may be no need for the local data network 110 and/or the home gateway 110a.

Private Network Addresses

In other embodiments of the present invention, each of the communication clients 108a, 108b and 108c can be assigned what is called a "non-routable", "local" or "private" network address. In these non-limiting embodiments, the private network addresses are used for the purposes of identifying the communication clients 108a, 108b and 108c within the local data network 110, while communication outside of the local data network 110 is implemented by using the aforementioned public network address assigned to the home gateway 110a (or, in some cases, the access device 106). In some non-limiting embodiments of the present invention, the home gateway 110a may be responsible for assigning private network addresses to the communication clients 108a, 108b and 108c. However, this need not be the case in every embodiment of the present invention. For example, the private network addresses can be assigned to the communication clients 108a, 108b and 108c by a dedicated address server (not depicted) coupled to the local data network 110 or to the data network 104.

In the specific non-limiting example depicted in FIG. 1, each of the communication clients 108a, 108b and 108c can be assigned a private network address by the home gateway 110a. For the sole purpose of simplifying the description to be presented herein below, it is assumed that both the private and the public network addresses are Internet Protocol (IP) addresses assigned according to the IPv4 protocol. However, it is expected that one of ordinary skilled in the art will easily adapt the teachings to be presented herein below to other addressing schemes.

Accordingly, the home gateway 110a may be assigned two IP addresses: a first IP address for the purposes of communicating with devices on the data network 104 (i.e. a so-called "network facing interface" IP address) and a second IP address for the purposes of communicating with devices on the local data network 110 (i.e. a so-called "premise facing interface" IP address). For example, the network facing interface IP address may comprise a public IP address "64.230.200.100". The assignment of this public IP address can be done by the aforementioned DHCP server (not depicted) coupled to the data network 104. The premise facing interface IP address may comprise a private IP address "192.168.1.1".

The home gateway 110a can be responsible for assigning private IP addresses to the communication clients 108a, 108b and 108c. For example, the communication client 108a may be assigned a private IP address "192.168.1.100", the communication client 108b may be assigned a private IP address "192.168.1.101" and the communication client 108c may be assigned a private IP address "192.168.1.102".

As one skilled in the art will appreciate, in the specific embodiment depicted in FIG. 1, the private IP addresses assigned to the communication clients 108a, 108b and 108c, as well as the private IP address assigned to the premise facing interface of the home gateway 110a, are only routable within the local data network 110, while the public IP address assigned to the network facing interface of the home gateway 110a is routable within the data network 104. Accordingly, in order to facilitate exchange of data between the communication clients 108a, 108b and 108c and the data network 104, the home gateway 110a can be operable to implement a Network Address Translation (NAT) operation or, in other words, to translate the private IP addresses assigned to the communication clients 108a, 108b and 108c for the purposes of routing data packets to/from the communication clients 108a, 108b and 108c using the public IP address assigned to the home gateway 110a.

NAT operation is known to those of skill in the art and, as such, no detailed description of the process will be presented here. However, for the benefit of the reader a brief overview will be presented. The home gateway 110a can be operable to receive a packet from one of the communication clients 108a, 108b and 108c (i.e. an outgoing packet). The home gateway 110a performs a NAT operation whereby a source address of the received outgoing packet (which in this non-limiting example can be the private IP address of one of the communication clients 108a, 108b and 108c that originated the outgoing packet) is substituted with the network facing interface IP address associated with the home gateway 110a and a port number that uniquely identifies one of the communication clients 108a, 108b, 108c which originated the outgoing packet. The home gateway 110a can further be operable to compile an internal mapping table 111. The internal mapping table 111 correlates at least (i) an original source address (i.e. the private IP address of one of the communication clients 108a, 108b, 108c that has originated the outgoing packet) to (ii) a port number assigned to the respective one of the communication clients 108a, 108b, 108c. In the specific non-limiting example of FIG. 1, the internal mapping table 111 correlates the private IP address of the communication client 108a (i.e. 192.168.1.100) to a port $110a_1$, the private IP address of the communication client 108b (i.e. 192.168.1.101) to a port $110a_2$, and the private IP address of the communication client 108c (i.e. 192.168.1.102) to a port $110a_3$. Data maintained within the internal mapping table 111 can allow the home gateway 110a to receive a packet destined for one of the communication clients 108a, 108b, 108c (i.e. an incoming packet addressed using the network facing interface IP address associated with the home gateway 110a and a port number associated with the one of the communication clients 108a, 108b, 108c to which the incoming packet is destined for) and using the internal mapping table 111, the home gateway 110a can route the incoming packet to the intended destination (i.e. one of the communication clients 108a, 108b, 108c). The home gateway 110a, thereby, allows for two-way exchange of packets between one or more of the communication clients 108*a*, 108*b* and 108*c* with any other device on the data network 104 (such as, for example, the communication client 116). It should be noted that in an alternative non-limiting embodiment of the present invention, the internal mapping table 111 can be maintained by another device accessible to the home gateway 110*a*.

In a similar manner, the communication client 116 may be associated with a network address. As a non-limiting example that is presented in FIG. 1, the communication client 116 can be directly coupled to the data network 104 without the use of a home gateway. This is particularly applicable in those embodiments, where the communication client 116 is embodied in a soft client executed on a computing apparatus, for example. In a non-limiting example, communication client 116 may be associated with an IP address "64.230.200.101", which may be a public IP address or, in other words, an IP address routable within the data network 104. For the purposes of a non-limiting illustration to be presented herein, it is assumed that the communication client 116 is coupled directly to the access connection 103*a* and, as such, exchange of data with the data network 104 can be performed without the need for any port number mapping.

For the purposes of exchanging data and, more specifically, for the purposes of establishing a communication session between one or more of the communication clients 108*a*, 108*b*, 108*c* and 116 (as well as potentially other communication clients), a registration process executed at the network element 112 can be implemented. For the sole purpose of simplifying the description to be presented herein below, an example of the communication session being a VoIP call will be used. However, it should be expressly understood that the type of communication sessions or the data exchanged between the communication clients 108*a*, 108*b*, 108*c* and 116 is not particularly limited and may include a video call, an instant messaging session or a multimedia session, to name just a few possibilities.

Figure 2:
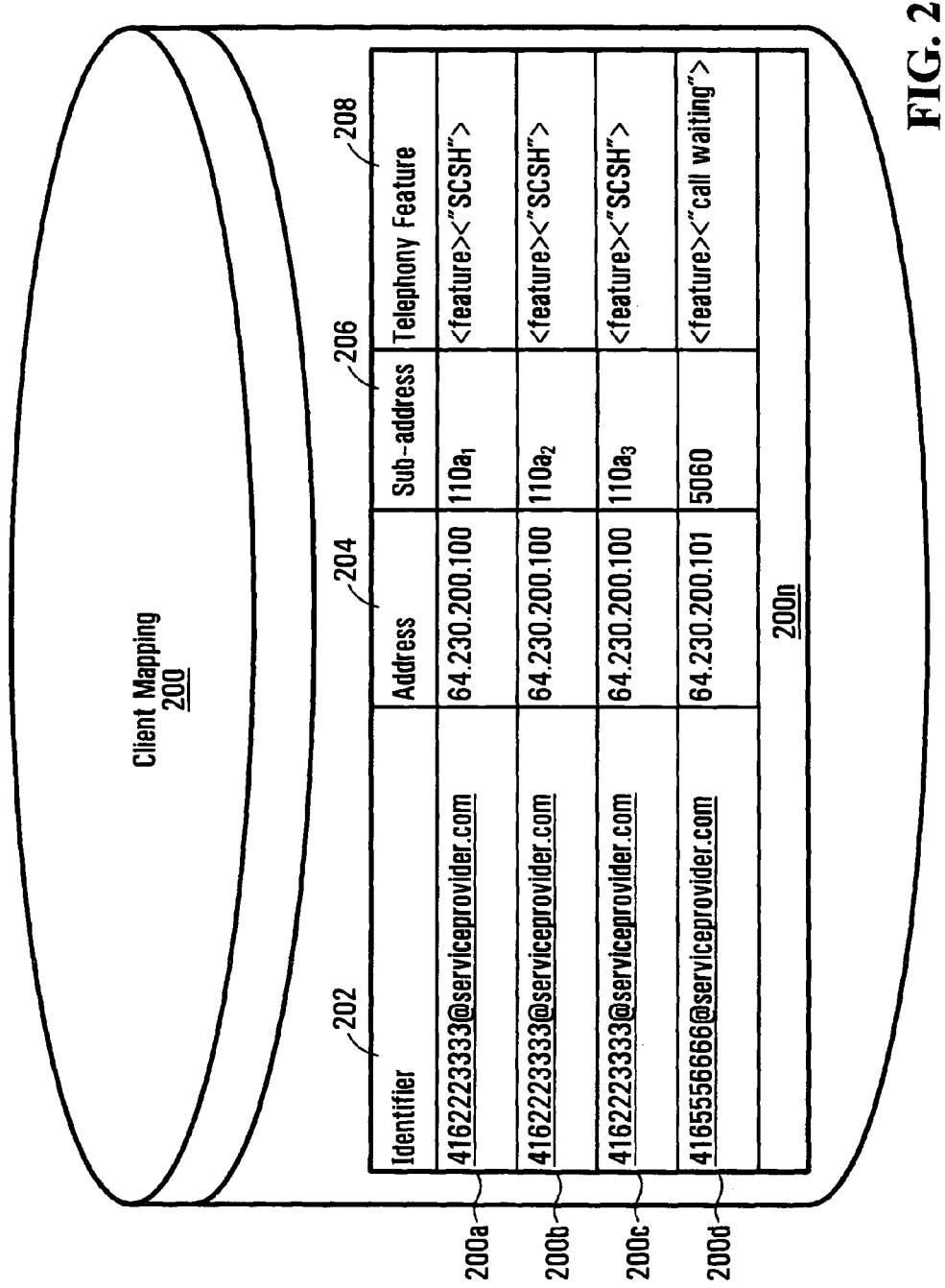
FIG. 2 is a diagram representing a non-limiting embodiment of a client mapping maintained by a network element of FIG. 1.

Before describing the registration process in detail, a client mapping 200 will now be described in greater detail with reference to FIG. 2. The client mapping 200 can be maintained by the network element 112 of FIG. 1 for the purposes of facilitating establishing of communication sessions between the communication clients 108*a*, 108*b*, 108*c*, 116 via the data network 104. The network element can maintain the client mapping 200 in an internal database or in a separate database (not depicted) accessible to and under control of the network element 112.

The mapping 200 may maintain a plurality of records, such as records 200*a*, 200*b*, 200*c* and 200*d*. Each of the records 200*a*, 200*b*, 200*c* and 200*d* may maintain information about registered communication clients, such as for example, communication clients 108*a*, 108*b*, 108*c* and 116 respectively. Each of the records 200*a*, 200*b*, 200*c* and 200*d* may maintain a relationship between an identifier 202, an address 204, a sub-address 206 and telephony features 208. In the specific non-limiting embodiment, the identifier 202 may comprise an alias or another identifier of a user (such as one of the users 101*a*, 101*b*) to which a particular communication client is registered. This alias (or other type of an identifier) or a portion thereof can be used by a third party, who would like to originate an incoming call destined for the user of the particular communication client, to identify the particular communication client. Some non-limiting examples of the identifier 202 include, but are not limited to, a user account, a proprietary identifier, a network address and the like. In the specific non-limiting embodiment to be presented herein below, the identifier 202 comprises a Session Initiation Protocol (SIP) Universal Resource Identifier (URI) address assigned on a per user account basis or, in other words, all communication clients registered to the same user are associated with the same SIP URI. For the avoidance of doubt, it should be expressly understood that the user account can be associated with the user 101*a*, as well as other users residing at the customer premises 102.

The address 204 may comprise an indication of a public network address associated with an endpoint where the communication client is located (such as, for example, the customer premises 102). The sub-address 206 may contain an identifier that may be used to uniquely identify a particular communication client within its local data network should this be the case (such as, for example, within the local data network 110 of the customer premises 102). For example, in the non-limiting example to be presented herein below, the sub-address 206 may comprise an indication of a port number of the home gateway 110*a* within the local data network 110 associated with a particular communication client. In an alternative non-limiting embodiment of the present invention, the sub-address 206 may comprise another suitable identifier, such as, for example, a private IP address. In an alternative non-limiting embodiment of the present invention, the sub-address 206 may comprise a value which represents a value derived on the basis of the port number of the home gateway 110*a*. In yet further non-limiting embodiments of the present invention, the sub-address 206 may comprise an arbitrary value assigned by the home gateway 110*a*. In alternative embodiments of the present invention, which are particularly applicable where the communication clients 108*a*, 108*b*, 108*c* and 116 can be assigned a public network address, the sub-address 206 may comprise a default value or may be omitted. In the specific non-limiting example being presented herein, the communication client 116 may be associated with the public IP address and, as such, the sub-address 206 associated with the communication client 116 may be a default port value.

The data maintained in the identifier 202 is referred to sometimes herein below as a "user account identifier" and the data maintained in the address 204 and sub-address 206 is jointly referred to as a "communication client identifier". In some examples, as described above, the communication client identifier may only comprise the address 204.

The telephony features 208 may comprise an indication of one or more features that the communication client associated with the specific record subscribes to. Examples of telephony features that may be provisioned within telephony features 208 include, but are not limited to, "call waiting", "voicemail", "three way calling", "differentiated ringing" and the like. According to non-limiting embodiments of the present invention, another telephony feature that may be provisioned within the telephony features 208 comprises a "second communication session handling" or "SCSH" feature. How the subscription to the SCSH feature is denoted in the client mapping 200 depends on the structure of the client mapping 200. In the specific non-limiting embodiment of FIG. 2, where the client mapping 200 is maintained on a "per communication client" basis, the SCSH feature can be denoted in association with each record associated with the each communication client that is associated with the SIP URI of the user who subscribes to the SCSH feature. In other variants of the present invention, which are particularly applicable in those embodiments where the client mapping 200 is maintained on a "per SIP URI" basis, the SCSH feature can be denoted in association with a SIP URI associated with the user who subscribes to the SCSH feature contemplated herein.

In some alternative non-limiting embodiments of the present invention, the indication of the "SCSH" feature in association with a record associated with a particular communication client may comprise a number of conditions. One non-limiting example of the SCSH condition may include a "ring" or a "do not ring" indicator indicative of whether or not the particular communication client should or should not be alerted during execution of various embodiments of the methods contemplated herein. Another non-limiting example of the SCSH condition may include scheduling data qualifying the above-mentioned "ring" or "do not ring" conditions. Generally speaking, the scheduling data may be indicative of a particular time of the day, day of the week, etc. of when the particular communication client should or should not be alerted during execution of various embodiments of the methods contemplated herein. Other examples will become apparent to those of skill in the art.

In some embodiments of the present invention, the subscription to the second communication session handling feature contemplated herein can be performed when the user 101a subscribes to the communication services to be delivered at the customer premises 102. In alternative non-limiting embodiments of the present invention, the subscription to the second communication session handling feature contemplated herein can be performed or changed at any other suitable time after the original service subscription. How the user 101a subscribes to or changes the settings of the second communication session handling feature contemplated herein is not particularly limited and some approaches may include, but are not limited to, calling a customer service representative, interacting with an interactive voice response system, accessing a provisioning web portal or web site, sending an electronic message, sending a short text message, sending an SMS message, sending an Instant Message and the like. In yet further embodiments of the present invention, the second communication session handling feature can be applied automatically to all communication clients served by the network element 112 and, as such, no subscription to the SCSH feature per se may be required. Within these non-limiting embodiments of the present invention, there may be no need for provisioning the SCSH feature within the telephony features 208 of the mapping 200.

The record 200a may be associated with the communication client 108a. As such, the identifier 202 of the record 200a may comprise an alias of the user 101a to whom the communication client 108a is registered or, in other words, who is the subscriber to communication services at the customer premises 102, such as, a SIP URI 4162223333@serviceprovider.com. It should be expressly understood that any other suitable form of the identifier 202 can be used, such as a numerical value, an alpha-numerical value, etc. The address 204 of the record 200a may comprise the public IP address associated with the home gateway 110a, which, in the specific non-limiting example being presented herein, is the public IP address "64.230.200.100". The sub-address 206 of the record 200a may comprise an indication of the port number of the home gateway 100a which is associated via the aforementioned internal mapping table 111 within the home gateway 110a with the communication client 108a or, in this non-limiting example, it may comprise "$110a_1$". The telephony features 208 of the record 200a may comprise <feature><"SCSH"> indicative that the user 101a is a subscriber to the second communication session handling feature of the present invention.

In a similar manner, the record 200b can be associated with the communication client 108b. Since in the non-limiting example being presented herein, the communication client 108b is associated with the same customer premises 102 as the communication client 108a, then for the purposes of the non-limiting example to be presented herein below, it is assumed that the communication client 108b is to be registered with the same user 101a. Accordingly, the identifier 202 of the record 200b can comprise an alias of the user 101a, which in the above-described example comprises the SIP URI 4162223333@serviceprovider.com. It should be expressly understood that any other suitable form of the identifier 202 can be used, such as a numerical value, an alpha-numerical value, etc. The address 204 of the record 200b may comprise the public IP address associated with the home gateway 110a, which, in the specific non-limiting example being presented herein, is the public IP address "64.230.200.100". The sub-address 206 of the record 200b may comprise an indication of the port number of the home gateway 110a which is associated via the aforementioned internal mapping table 111 within the home gateway 110a with the communication client 108b or, in this non-limiting example, it may comprise "$110a_2$". The telephony features 208 of the record 200b may comprise <feature><"SCSH"> indicative that the user 101a is a subscriber to the second communication session handling feature of the present invention.

In a similar manner, the record 200c can be associated with the communication client 108c. Since in the non-limiting example being presented herein, the communication client 108c may be associated with the same customer premises 102 as the communication clients 108a, 108b, then for the purposes of the non-limiting example to be presented herein below, it is assumed that the communication client 108c is to be registered with the same user 101a as the communication clients 108a, 108b. Accordingly, the identifier 202 of the record 200c can comprise an alias of the user 101a, which in the above-described example comprises the SIP URI 4162223333@serviceprovider.com. It should be expressly understood that any other suitable form of the identifier 202 can be used, such as a numerical value, an alpha-numerical value, etc. The address 204 of the record 200c may comprise the public IP address associated with the home gateway 110a, which, in the specific non-limiting example being presented herein, is the public IP address "64.230.200.100". The sub-address 206 of the record 200c may comprise an indication of the port number of the home gateway 110a which is associated via the aforementioned internal mapping table 111 within the home gateway 110a with the communication client 108c or, in this non-limiting example, it may comprise "$110a_3$". The telephony features 208 of the record 200c may comprise <feature><"SCSH"> indicative that the user 101a is a subscriber to the second communication session handling feature of the present invention.

The record 200d may be associated with the communication client 116. The identifier 202 of the record 200d may comprise an alias of the user 101b to whom the communication client 116 is registered or, in other words, who is the subscriber to communication services at a location where the communication client 116 is located, such as, a SIP URI 4165556666@serviceprovider.com. It should be expressly understood that any other suitable form of the identifier 202 can be used, such as a numerical value, an alpha-numerical value, etc. The address 204 of the record 200d may comprise the public IP address associated with the communication client 116, which, in the specific non-limiting example being presented herein, is the public IP address "64.230.200.101". The sub-address 206 of the record 200d may comprise an indication of the default port used for exchanging data between the communication client 116 and the data network 104 or, in this non-limiting example, it may comprise the default port number "5060". In alternative embodiments of the present invention, the sub-address 206 can be left blank. In further embodiments of the present invention, when the exchanging of data is implemented using the default port, the sub-address 206 can be omitted altogether. The telephony features 208 of the record 200*d* may comprise "call waiting" indicative that the user 101*b* is a subscriber to the call waiting feature and is not a subscriber to the second communication session handling feature of the present invention.

Figure 6:
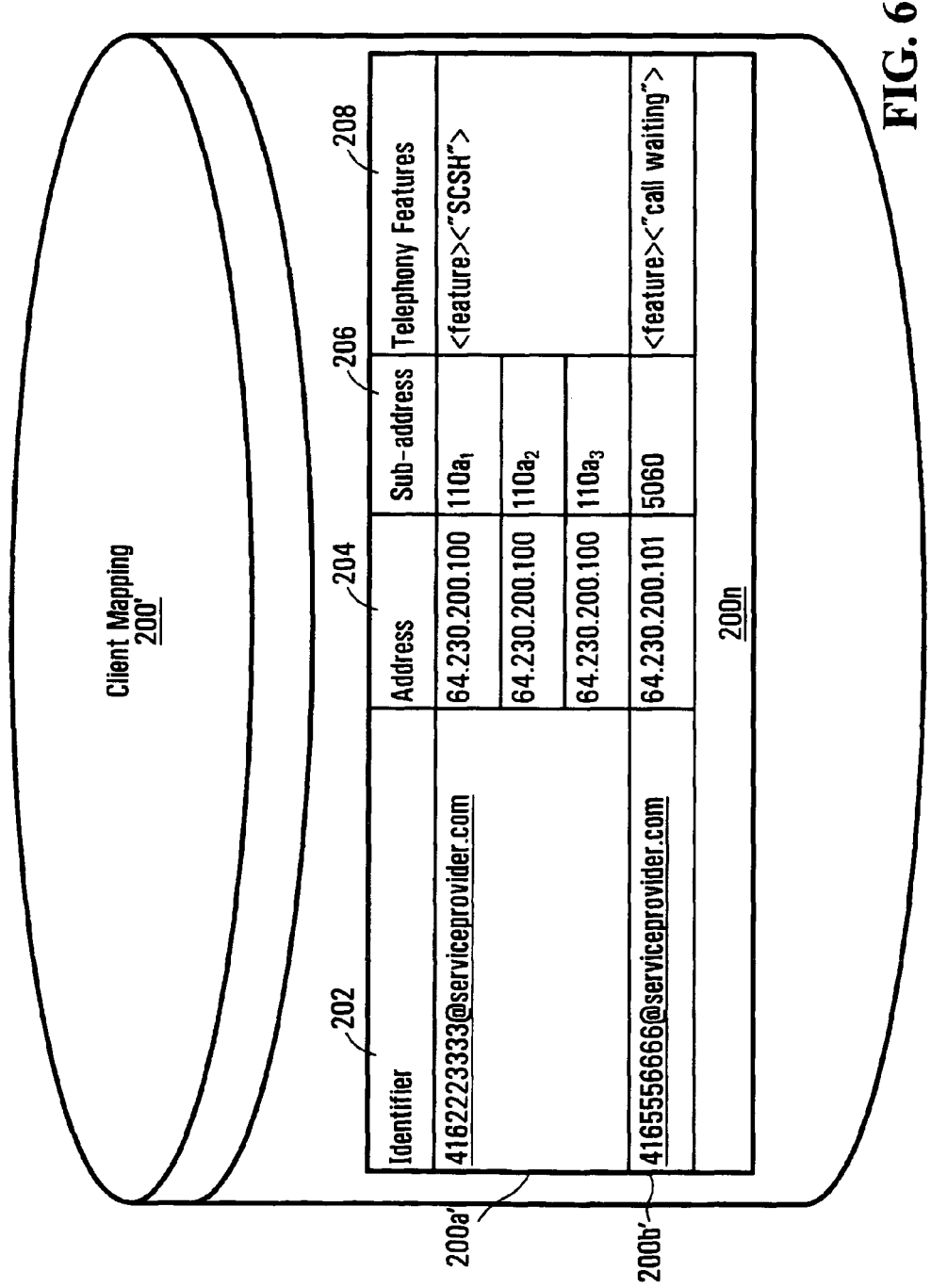
FIG. 6 is a diagram representing another non-limiting embodiment of the client mapping maintained by a network element of FIG. 1.

The client mapping 200 may maintain a number of additional records, jointly depicted at 200*n*. These additional records 200*n* may be associated with other communication clients of the infrastructure of FIG. 1, which have been omitted for the sake of simplicity. It should be noted that the SCSH feature may be provisioned in a different way from that described as an example above. For example, in an alternative non-limiting embodiment of the present invention, the SCSH feature may be provisioned on a per SIP URI basis, rather as on per-communication-client basis. An example of such arrangement is depicted as a client mapping 200' in FIG. 6. Client mapping 200' can be substantially similar to the client mapping 200 and, as such, like elements are depicted with like numerals. Within the non-limiting embodiment of the client mapping 200', a record 200*a*' is maintained for the SIP URI associated with the user 101*a* and a record 200*d*' is maintained for the SIP URI associated with the user 101*b*.

In yet further non-limiting embodiments of the present invention, the SCSH feature may be provisioned in a separate database from the client mapping 200. Within these non-limiting embodiments of the present invention, the database can map, for example, a SIP URI associated with a user who subscribes to the second communication session handling feature contemplated herein and a flag indicative of the fact that the user is the subscriber to the second communication session handling feature contemplated herein. In some non-limiting embodiments of the present invention, the above-mentioned active call table may be integrated with the client mapping 200.

How the client mapping 200 is generated is not particularly limited. In a specific non-limiting embodiment of the present invention, the client mapping 200 may be generated during a registration process of the communication clients 108*a*, 108*b*, 108*c* and 116 with the network element 112. Prior to describing the registration process, certain non-limiting assumptions will be made for the sole purpose of illustrating and providing an example for the description to be presented below.

Firstly, it is assumed that the communication clients 108*a*, 108*b*, 108*c* and 116 and the network element 112 implement a communication protocol for exchanging data therebetween. In a specific non-limiting embodiment of the present invention, the communication protocol may comprise Session Initiation Protocol (SIP). In an alternative non-limiting embodiment of the present invention, the communication protocol may comprise Simple Object Access Protocol (SOAP) or it may comprise ITU-T's H.323 signalling protocol. It should be expressly understood that any suitable communication protocol may be used, whether standards-based or proprietary. Some examples of the proprietary protocols that can be used include, but are not limited to, Unified Stimulus (UNISTIM) protocol, Mitel Networks Telephony Application Inter (MiTAI) protocol, Skiny, etc.

Secondly, it is assumed that each of the communication clients 108*a*, 108*b*, 108*c* and 116 is aware of the location of the network element 112 or, in other words, a network address associated with the network element 112. In some embodiments of the present invention, the network element 112 may be associated with a static network address, such as, but not limited to, a static IP address "64.230.100.100". In these embodiments of the present invention, the communication clients 108*a*, 108*b*, 108*c* and 116 may be pre-programmed with the static IP address of the network element 112. In an alternative embodiment of the present invention, the network element 112 may be associated with a Uniform Resource Locator (URL), such as, for example, "http://www.soft-switch.serviceprovider.com". In these non-limiting embodiments of the present invention, the communication clients 108*a*, 108*b*, 108*c* and 116 may be pre-programmed with the URL of the network element 112. In yet further non-limiting embodiments of the present invention, the network element 112 may be associated with a dynamic network address, such as, for example, a dynamic IP address. In these non-limiting embodiments of the present invention, the communication clients 108*a*, 108*b*, 108*c* and 116 may discover the dynamic IP address of the network element 112 via an appropriate address discovery procedure, such as, for example, a Domain Name Service (DNS) look up. In some non-limiting embodiments of the present invention, the home gateway 110*a* or the access device 106 can be aware of the location of the network element 112 rather than the communication clients 108*a*, 108*b*, 108*c*. It should be noted that in alternative non-limiting embodiments of the present invention, the communication clients 108*a*, 108*b*, 108*c* may not be aware of the location of the network element 112. They may be, instead, be aware of the location of another network element (such as, for example, a Session Border Controller, a proxy server, etc.).

Figure 3:
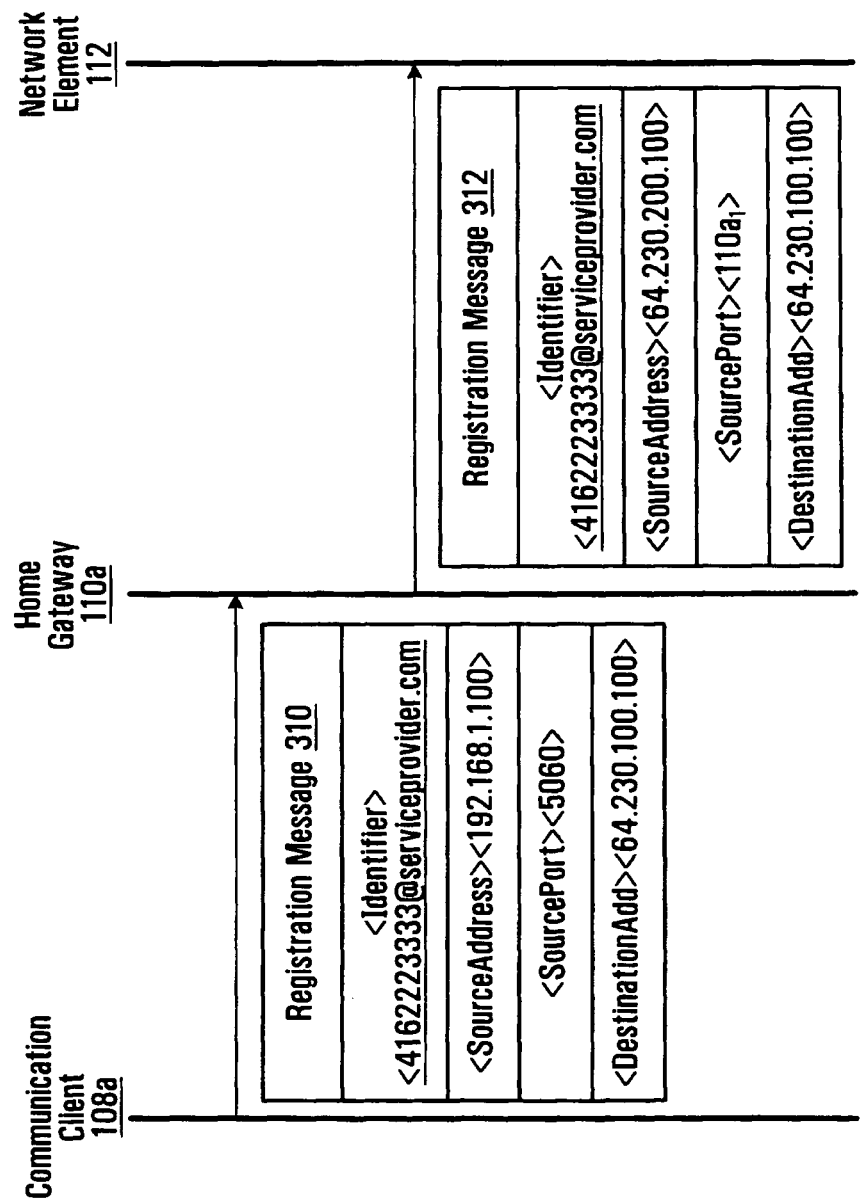
FIG. 3 is a signal flow diagram depicting a non-limiting embodiment of a flow of signals exchanged between a communication client and the network element of FIG. 1 during a registration process.

Having made these non-limiting assumptions, a registration process by virtue of which the communication clients 108*a*, 108*b*, 108*c* and 116 can register with the network element 112 will now be described in greater detail. With reference to FIG. 3, an example of how the communication client 108*a* can register with the network element 112 will now be described. In some non-limiting embodiments of the present invention, the communication client 108*a* may perform the registration process, when the communication client 108*a* is powered on for the first time. In an alternative non-limiting embodiment of the present invention, the communication client 108*a* may perform the registration process after being unplugged and moved to a new location. In yet further non-limiting embodiments of the present invention, the communication client 108*a* can perform the registration process on-demand, for example, when triggered by the user 101*a*, by an application executed on the communication client 108*a* or by an application executed on another device in the customer premises 102 or connected to the data network 104. For example, each of the records 200*a*-200*n* may be assigned an "expiry" indicator. The expiry indicator can be set by the network element 112, it can be requested by the communication client submitting a registration request or it can comprise a default value (ex. 3600 seconds or the like). When the "expiry" indicator expires or shortly thereafter, the network element 112 may cause the respective communication client associated with the expired record 200*a*-200*n* to re-execute the registration process.

It should noted that in alternative non-limiting embodiments of the present invention, a service provider who is responsible for managing the network element 112 can pre-provision the client mapping 200. Within these embodiments of the present invention, the registration process can be omitted. This scenario is particularly applicable in those non-limiting embodiments of the present invention, where the communication clients 108a, 108b, 108c, 116 are assigned a static network address.

It should be noted that in some non-limiting embodiments of the present invention, each of the communication clients 108a, 108b, 108c and 116 may be aware of its respective identifier 202. How the communication clients 108a, 108b, 108c and 116 may become aware of their respective identifiers 202 is not particularly limited. In some embodiments of the present invention, an indication of the identifier 202 may be programmed into the communication clients 108a, 108b, 108c and 116 before they are dispatched to the respective users 101a, 101b. However, in alternative non-limiting embodiments of the present invention, the indication of the identifier 202 can be inputted by the respective user 101a, 101b during the registration process. In an alternative non-limiting embodiment of the present invention, the indication of the identifier 202 can be determined by the communication client 108a by interacting with the home gateway 110a or with the access device 106. For the purposes of the non-limiting example to be presented herein below, it is assumed that the user 101a has inputted the indication of the identifier 202 (i.e. 4162223333@serviceprovider.com) into the communication client 108a.

The communication client 108a generates a registration message 310. In some embodiments of the present invention, the registration message 310 comprises a packet comprising a SIP Registration message. In an alternative non-limiting embodiment, the registration message 310 comprises the SIP Registration message. The registration message 310 can comprise an indication of an identifier of the communication client 108a, such as the SIP URI 4162223333@serviceprovider.com (i.e. an "identifier"). The registration message 310 can further comprise an indication of a network address of the communication client 108a (ex. a so-called "source address"), which in this non-limiting example can comprise the private IP address of the communication client 108a (i.e. the private IP address 192.168.1.100) and an indication of a source port, which can be a TCP/UDP port value (ex. "5060"). The registration message 310 can further comprise an indication of the network address of the network element 112 (ex. the public IP address 64.230.100.100), i.e. a so-called "destination address". In an alternative non-limiting embodiment of the present invention, the destination address may be omitted from the registration message 310. Within these embodiments of the present invention, the destination address can be populated, for example, by the home gateway 110a as part of compiling a registration message 312 to be described below or by another entity. In further alternative non-limiting embodiments of the present invention, the identifier of the communication client 108a can be omitted from the registration message 310. Within these embodiments of the present invention, the identifier of the communication client 108a can be populated, for example, by the home gateway 110a as part of compiling a registration message 312 to be described below or by another entity. The communication client 108a then sends the registration message 310 towards the home gateway 110a via the local data network 110, using for example, SIP protocol.

The home gateway 110a receives the registration message 310 and compiles the registration message 312 by augmenting data received as part of the registration message 310. To that end, the home gateway 110a creates the registration message 312 by replacing the value in the received source address by its own public IP address, which in this non-limiting example can comprise the public IP address of the home gateway 110a (i.e. the public IP address "64.230.200.100"). The home gateway 110a further substitutes the value of the received source port with the source port number of the home gateway 110a associated with the communication client 108a (ex. "$110a_1$"). The home gateway 110a then sends the registration message 312 towards the network element 112 via the access device 106 and the data network 104.

When the network element 112 receives the registration message 312, it examines its content. It retrieves the identifier of the communication client 108a from the registration message 312 and generates the identifier 202 of the record 200a. It then retrieves the source address and populates the address 204. Using the data received as part of the source port, the network element 112 generates the sub-address 206. Accordingly, the network element 112 is operable to generate the aforementioned record 200a with the information received as part of the registration message 312. If the network element 112 determines that the record 200a associated with the communication client 108a already exists (i.e. an old record 200a), the network element 112 can delete the old record 200a and populate a new record 200a with the identifier 202, the address 204 and the sub-address 206 received as part of the registration message 312. Alternatively, the network element 112 can modify a portion of the old record 200a to derive the new record 200a.

In substantially the same manner, the communication clients 108b and 108c can generate and transmit registration messages similar to the registration messages 310 to enable the network element 112 to populate records 200b and 200c respectively. The communication client 116 can generate a registration message similar to the registration message 312 with a default port number as the sub-address 206 to enable the network element 112 to populate the record 200d.

It should be noted that in alternative non-limiting embodiments of the present invention, where the home gateway 110a is not SIP-aware, the home gateway 110a may perform NAT operation on an IP packet encapsulating the SIP registration request. Within these embodiments, the home gateway 110a amends information maintained within the IP packet encapsulating the SIP registration request and leaves the SIP registration request intact.

The network element 112 may generate the content of the telephony features 208 during the registration process described immediately above. In an alternative non-limiting embodiment of the present invention, the network element 112 may generate the telephony features 208 for each of the communication clients (ex. the communication clients 108a, 108b, 108c) associated with the user 101a at a later time, when the user 101a subscribes to the SCSH feature.

It should be understood that several components of the infrastructure of FIG. 1 can be omitted, configured differently or substituted by alternative components. A non-limiting example of one possible alternative of the infrastructure of FIG. 1 will now be described. In the specific non-limiting embodiment depicted in FIG. 1, the communication clients 108a, 108b and 108c are all registered to the same user 101a (i.e. all of the communication clients 108a, 108b and 108c are associated with the same identifier 202) and are all located at the customer premises 102. However, in an alternative non-limiting embodiment of the present invention, the communication clients 108a, 108b and 108c may be registered to the same user 101a (i.e. be associated with the same identifier 202), but may not be necessarily all located at the customer premises 102. For example, the communication client 108c may comprise a wireless VoIP phone and, as such, may not be physically located at the customer premises 102 all the time. As another example, the communication client 108b may be a VoIP phone located at a cottage (not depicted), but nevertheless may still be registered to the same user account associated with the user 101a. Accordingly, it should be understood that, broadly speaking, the communication clients 108a, 108b and 108c are associated with the user 101a not by virtue of being in the same location (ex. the customer premises 102), but rather being registered to a single user account (ex. the user account associated with the user 101a). It should be further understood that within these non-limiting alternative embodiments, the various communication clients associated with the same user account will all have the same "user account information" (or another identifier) stored within identifier 202 of the client mapping 200, but may have different network addresses stored within the address 204 and sub-address 206.

Figure 4:
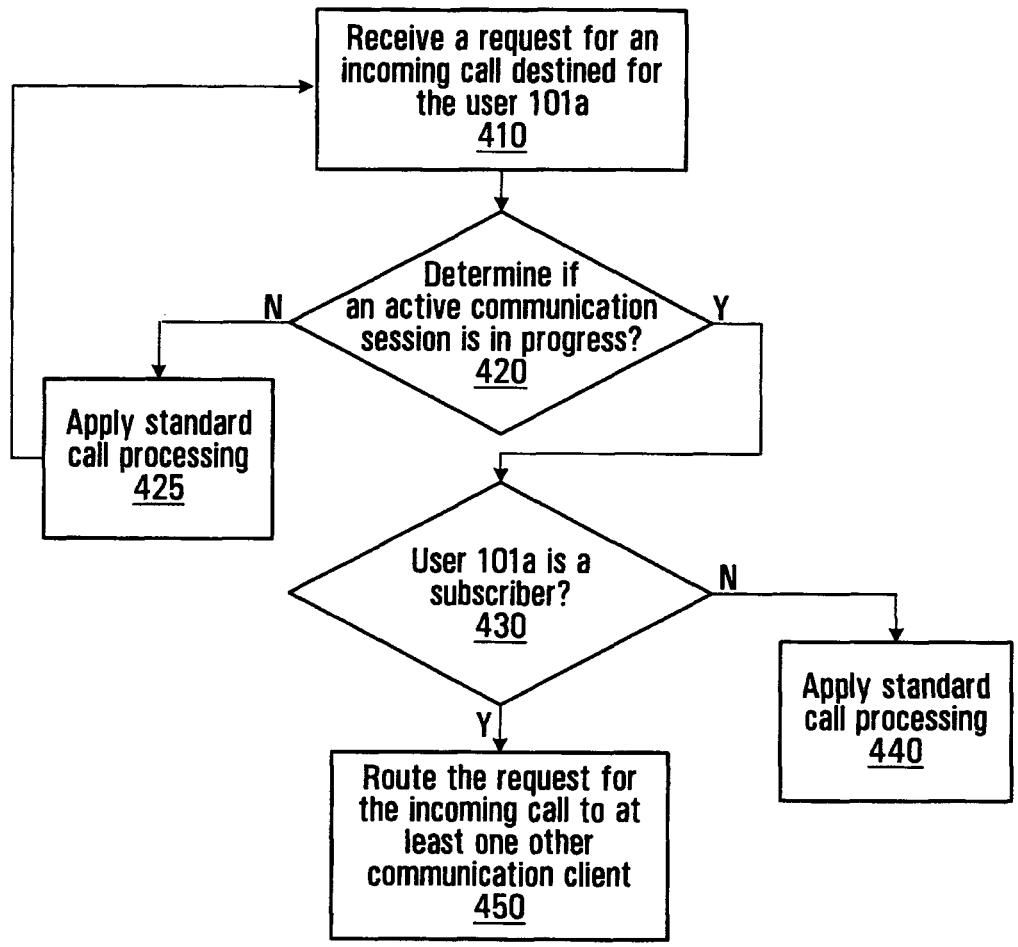
FIG. 4 is a flow chart representing a non-limiting embodiment of a method for handling a request for a media-over-packet communication session within the infrastructure of FIG. 1.

Given the infrastructure of FIG. 1, it is possible to execute a method for handling a request for a communication session. With reference to FIG. 4, a non-limiting embodiment of a method for handling a request for a communication session will be described. An example non-limiting embodiment of the method will be described in the context of the following non-limiting assumption:

the user 101a is a subscriber to the second communication session handling feature of the embodiments of the present invention and, as such, the telephony features 208 of the records 200a, 200b and 200c have been provisioned as has been described above with reference to FIG. 2.

Step 410

The method begins at step 410, at which the network element 112 receives a request for an incoming call destined for the user 101a. For the purposes of the description to be presented herein below, it is assumed that the incoming call is a voice call. It should be expressly understood that the voice call is just one non-limiting example of a communication session a request for establishing of which can be handled using embodiments of the method presented herein. Other non-limiting types of the communication sessions include, but are not limited to, multimedia calls, video calls and the like.

In some non-limiting embodiments of the present invention, the network element 112 receives a SIP INVITE message indicative of the incoming call destined for the user 101a. The SIP INVITE message may identify the user 101a, for example, by the SIP URI "4162223333@serviceprovider.com" or a portion thereof. In alternative non-limiting embodiments of the present invention, another suitable type of signalling message indicative of the incoming call destined for the user 101a may be received at the network element 112.

Step 420

Next, at step 420, the network element 112 determines if an active communication session is in progress with at least one communication client associated with the user 101a (i.e. at least one of the communication clients 108a, 108b and 108c).

It will be recalled that as part of step 410, the network element 112 has become aware of SIP URI of the user 101a, which the incoming call is destined for. The network element 112 accesses the client mapping 200 and performs a look up of the identifiers 202 that match the SIP URI received as part of the SIP INVITE message or another signalling message used for establishing the second incoming call. In the specific example being presented herein, the network element 112 determines that records 200a, 200b and 200c are associated with the identifier 202 that matches the SIP URI that has been received as part of step 410 within the SIP INVITE message or another signalling message used for establishing the second incoming call. Accordingly, the network element 112 determines that communication clients 108a, 108b and 108c are registered in association with the user 101a.

The network element 112 then retrieves data stored within the addresses 204 and the sub-addresses 202 of the records 200a, 200b and 200c (i.e. with the communication clients 108a, 108b and 108c). The network element 112 then accesses the aforementioned active call table (not depicted) to determine if any of the communication clients 108a, 108b, 108c are engaged in an active communication session, the determination being based on the data maintained within the addresses 204 and the sub-addresses 206 of the records 200a, 200b, 200c.

Step 425

If the network element 112 determines that none of the communication clients 108a, 108b, 108c is engaged in an active communication session (i.e. the "NO" branch of step 420), the network element 112 can apply standard call processing.

For example, if the network element 112 determines that no active communication session exists, the network element 112 can, for example, alert all of the communication clients 108a, 108b and 108c of the incoming call (which, in this non-limiting scenario, would be the only telephony session associated with the user 101a in existence). This can be achieved, for example, by formulating and sending SIP INVITE messages destined for the communication clients 108a, 108b and 108c in substantially the same manner as when connecting an incoming call in the absence of the second communication session handling feature contemplated herein.

The method for handling an incoming media-over-packet communication session may then loop back to step 410 where it awaits receipt of another request for another incoming call.

Step 430

If, on the other hand, the network element 112 determines that an active communication session is in progress with one of the communication clients registered in association with the user 101a for which the incoming call is destined for (i.e. the "YES" branch of step 420), the network element 112 executes step 430.

For the purposes of the description to be presented herein below, it is assumed that an active communication session is in progress between the communication client 108a and the communication client 116. This active communication session is depicted in FIG. 1 by a broken like "A" and is referred to herein below as an "active communication session A". Accordingly, in the specific non-limiting example being presented herein, the network element 112 determines that the communication client 108a is indeed engaged in the active communication session "A" and proceeds to execution of step 430.

At step 430, the network element 112 can determine if the user 101a, whom the incoming call is destined for, is a subscriber to the second communication session handling feature contemplated herein. To that end, the network element 112 accesses the client mapping 200 and performs a look up of the identifiers 202 that match the SIP URI received as part of the SIP INVITE message or another signalling message used for establishing the second incoming call. Within the specific non-limiting embodiment of the client mapping 200 of FIG. 2, the network element 112 then examines telephony features 208 provisioned in association with the communication clients registered to the user 101a (i.e. communication clients 108a, 108b, 108c) in order to determine if the communication clients associated with the user 101a (i.e. the communication clients 108a, 108b or 108c) have been provisioned with the second communication session handling feature contemplated herein. Within the specific non-limiting embodiment of the client mapping 200' of FIG. 6, the network element 112 then examines telephony features 208 provisioned in association with the SIP URI associated with the user 101a, whom the incoming call is destined for.

Step 440

If the network element 112 determines that the communication clients associated with the user 101a (i.e. the communication clients 108a, 108b or 108c) have not been provisioned with the second communication session handling feature contemplated herein (i.e. the "NO" branch of step 430), standard call processing can be applied at step 440. In the context of the description presented herein, the term "standard call processing" is used to signify call processing that would apply in the absence of the second communication session handling feature contemplated herein. In other words, if the network element 112 determines that none of the communication clients associated with the user 101a (i.e. none of the communication clients 108a, 108b or 108c) has been provisioned with the second communication session handling feature contemplated herein, the network element 112 can, for example, provide a busy signal to the originator of the second incoming call. In an alternative embodiment of the present invention, the network element 112 can forward the incoming call to a voicemail system, if the user 101a subscribed to the voicemail system. In yet further non-limiting embodiments of the present invention, the network element 112 can invoke a call waiting feature, if the user 101a subscribed to such a feature.

In some embodiments of the present invention, steps 430, 440 can be omitted and the network element 112 may proceed to execution of step 450 once it is determined in step 420 that the active communication session "A" is in progress. This is particularly applicable in non-limiting embodiments where the second communication session handling feature contemplated herein is applied automatically to all communication clients served by the network element 112.

Step 450

If, on the other hand, it is determined that the communication clients associated with the user 101a (i.e. the communication clients 108a, 108b or 108c) have been provisioned with the second communication session handling feature contemplated herein (i.e. the "YES" branch of step 430), the network element 112 proceeds to execution of step 460.

At step 450, the network element 112 routes the incoming call to at least one other communication client registered in association with the user 101a other than the communication client that terminates the active communication session "A" (i.e. other than the communication client 108a).

In the specific non-limiting example being presented herein, the network element 112 routes the incoming call to the communication client 108b and 108c. To that end, the network element 112 can generate a SIP INVITE message specifically destined to the communication clients 108b, 108c the SIP INVITE message for connecting the incoming call to the communication clients 108b, 108c. It should be expressly understood that any other suitable type of signalling message can be used for connecting the incoming call to the communication clients 108b, 108c.

More specifically, the network element 112 accesses the record 200b within the client mapping 200 and retrieves the identifier 202, the address 204 and the sub-address 206 of the records 200b, 200c. Based on at least some of the identifier 202, the address 204 and the sub-address 206 of the records 200b, 200c, the network element 112 compiles two SIP INVITE messages (or other suitable types of the signalling message) and sends the SIP INVITE messages (or other suitable types of the signalling message) towards the communication clients 108b, 108c. This is depicted in FIG. 1 as a signalling message "SM1" transmitted by the network element 112 towards the communication client 108b and a signalling message "SM2" transmitted by the network element 112 towards the communication client 108c.

The SIP INVITE message (or another suitable type of the signalling message) can be operable to cause the communication clients 108b, 108c to emit an audio, visual and/or another type of signal indicative of an incoming call. Upon the user 101a lifting the receiver of one of the communication clients 108b, 108c or otherwise putting one of the communication client 108b, 108c into an off-hook state, the network element 112 causes the incoming call to be terminated on one of the communication clients 108b, 108c.

A First Optional Enhancement

In an alternative non-limiting embodiment of the present invention, the user 101a may provision a number of conditions associated with the second communication session handling feature contemplated herein. For example, the user 101a can optionally specify which specific ones of the communication clients 108a, 108b, 108c should be alerted during the implementation of the second communication session handling feature contemplated herein. The user 101a can further optionally specify a time interval during which the specific ones of the communication clients 108a, 108b, 108c should be alerted during the implementation of the second communication session handling feature contemplated herein. The user 101a can further optionally specify a Caller Line Identifier (or another type of network identifier) associated with an originating party in association with some of the communication clients 108a, 108b, 108c indicative of the incoming calls from specific originating parties of which the specific ones of the communication clients 108a, 108b, 108c should be alerted of during the implementation of the second communication session handling feature contemplated herein. Within these embodiments of the present invention, some of the communication clients 108a, 108b, 108c can be provisioned with one or more conditions indicative of the network identifier(s) of one or more "allowed originating parties" an incoming call from which should trigger an alert to a specific one of some of the communication clients 108a, 108b, 108c.

Figure 5:
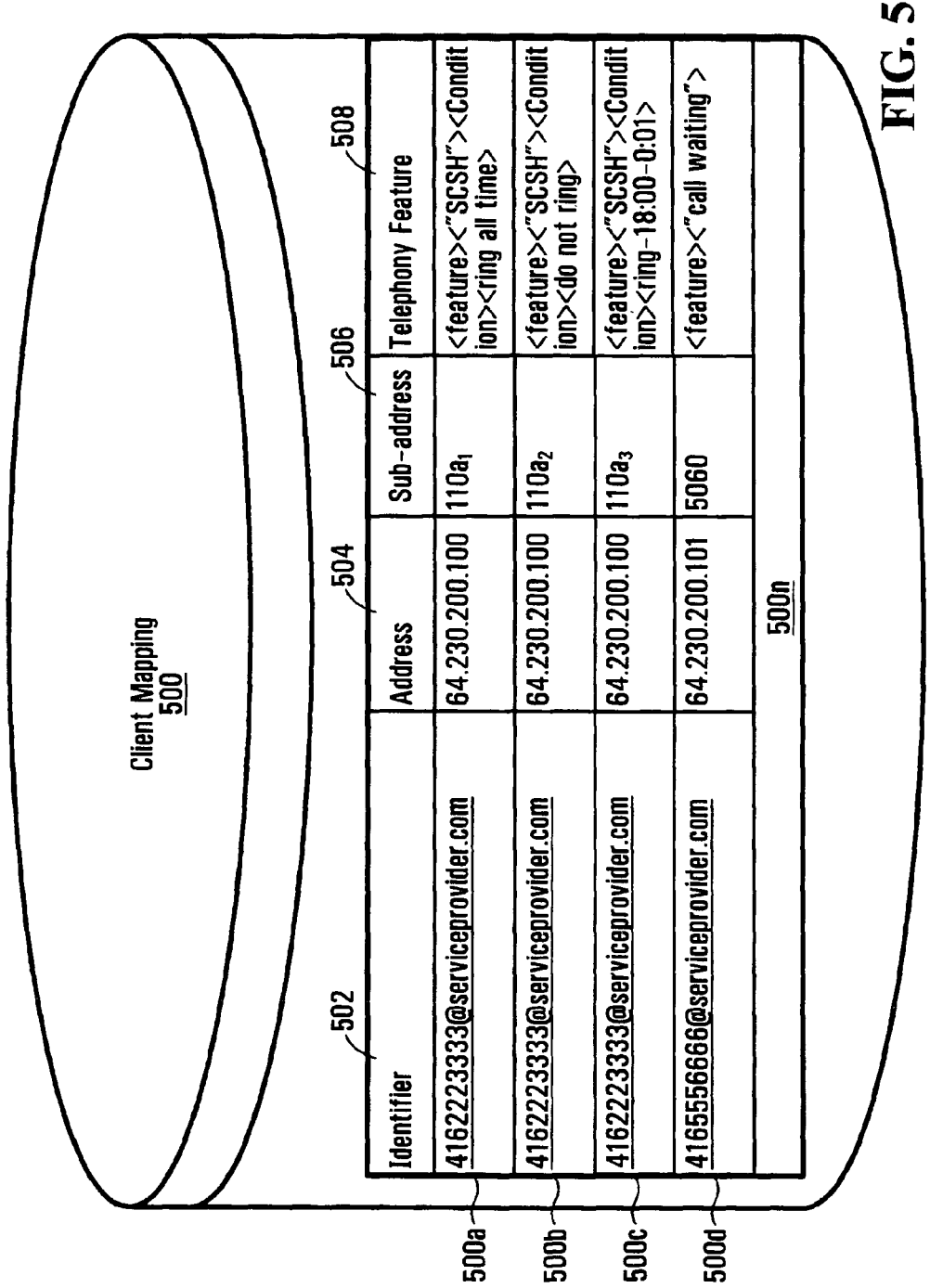
FIG. 5 is a diagram representing another non-limiting embodiment of the client mapping maintained by the network element of FIG. 1.

Within these non-limiting embodiments, the network element 112 may maintain a client mapping 500 as depicted in FIG. 5. The client mapping 500 may be substantially similar to the client mapping 200 of FIG. 2. As such, the client mapping 500 may maintain a number of records, such as records 500a, 500b, 500c, 500d associated with the communication clients 108a, 108b, 108c, 116 respectively. Within each of these records, the client mapping 500 may map an identifier 502 to an address 504, a sub-address 506 and telephony features 508. For the purposes of the specific non-limiting embodiment to be presented herein below, the following scenario will be used. It is assumed that the user 101a subscribes to the second communication session handling feature contemplated herein and that the user 101*a* has provisioned the following conditions:

the communication client 108*a* should be alerted during execution of various embodiments of the methods contemplated herein irrespective of the time when the incoming call is received;

the communication client 108*b* should not be alerted during the execution of various embodiments of the methods contemplated herein;

the communication client 108*c* should be alerted during execution of various embodiments of the methods contemplated herein, but only if the incoming call is received between 18:00 and midnight.

The telephony features 508 of the client mapping 500 has been populated accordingly. The client mapping 500 can, of course, maintain a number of additional records that have been jointly depicted at 500*n*.

Given these assumptions and the client mapping 500, step 430 can be augmented in the following manner. As part of step 430, the network element 112 can determine if any conditions have been provisioned in association with any given one of at least some of the communication clients 108*a*, 108*b*, 108*c*.

To that end, the network element 112 can examine the telephony features 508 of the records 500*a*, 500*b* and 500*c* that are associated with the communication clients 108*a*, 108*b*, 108*c*. More specifically, the network element 112 determines that the telephony features 508 of the record 500*a* comprises <feature><"SCSH"><condition><ring all times> and, therefore, deduces that the communication client 108*a* should be alerted during the implementation of the second communication session handling feature irrespective of the time when the second communication session handling feature is executed. The network element 112 further determines that the telephony features 208 of the record 500*b* comprises <feature><"SCSH"><condition><do not ring> and, therefore, deduces that the communication client 108*b* should not be alerted during the implementation of the second communication session handling feature. The network element 112 further determines that the telephony features 508 of the record 500*c* comprises <feature><"SCSH"><condition><ring-18:00-00:01> and, therefore, deduces that the communication client 108*c* should be alerted during the implementation of the second communication session handling feature only if the second communication session handling feature is executed during the specific time interval (i.e. between 6 pm and midnight).

The network element 112 then determines if the provisioned feature conditions are met. It will be recalled that the network element 112 may comprise circuitry, software and/or control logic for determining the current time. The network element 112 consults the circuitry, software and/or control logic to determine the current time and compares the current time with the data stored in the <condition> of the telephony features 508 of the record 500*c*. If the current time does not match the data stored in the <condition> of the telephony features 508 of the record 500*c*, the network element 112 determines that the communication client 108*c* should not be alerted during the implementation of the second communication session handling feature. If, on the other hand, the current time matches the data stored in the <condition> of the telephony features 508 of the record 500*c*, the network element 112 determines that the communication client 108*c* should be alerted during the implementation of the second communication session handling feature. For the purposes of the description to be presented herein below, it shall be assumed that the current time is 19:00 and, therefore, the network element 112 has determined that the communication client 108*c* should be alerted during the implementation of the second communication session handling feature.

To summarize, as part of the augmented step 430, the network element 112 has determined that:

the communication client 108*b* should not be alerted of the second incoming call; and that the communication client 108*c* should be alerted of the incoming call.

The network element 112 can then proceed to execution of step 450 based on the determination(s) made in the augmented step 430. Within this specific example, the network element 112 generates a SIP INVITE message (or another signalling message) destined only to the communication client 108*b*.

A Second Optional Enhancement

In some non-limiting embodiments of the present invention, an optional enhancement can be implemented as part of step 450. Within these non-limiting embodiments of the present invention, a user of the communication client 108*a* who is involved in the active communication session "A" can be advised of the incoming call and, in some embodiments of the present invention, can provide a disposition instruction which can be relied, at least in part, for processing of the incoming call. The network element 112 can first announce via the active communication session "A" to the user of the communication client 108*a* that the incoming call is detected.

In a first non-limiting example, the network element 112 may transmit a trigger to the communication client 108*a* to trigger the communication client 108*a* to present an audible signal, such as, for example, a distinctive beep or a message. The message can take the form of, for example, a synthesized audible message: "Another incoming call is detected". In a second non-limiting example, the network element 112 may cause the communication client 108*a* to present a visual signal to the communication client 108*a* to be displayed on a display. This visual signal may take a myriad of forms and its main function is to advise the user of the communication client 108*a* that the incoming call is detected. Naturally, a combination of the audio and the visual notification can be presented.

In these non-limiting embodiments of the present invention, the network element 112 may further solicit from the user of the communication client 108*a* a disposition instruction, the disposition instruction for indicating to the network element 112 as to how to handle the second incoming call. In a first non-limiting scenario, the user of the communication client 108*a* may choose to accept the incoming call at the communication client 108*a* (i.e. to partially override or to cancel the second communication session handling feature for the particular incoming call). In a second non-limiting scenario, the user of the communication client 108*a* may indicate that the default second communication session handling feature should apply or, in other words, the network element 112 should continue with execution of various embodiments of the methods contemplated herein and that the incoming call should be handled in accordance with the telephony features 208 provisioned in the client mapping 200. In yet further non-limiting scenario, the user of the communication client 108*a* may impose further conditions on the second communication session handling feature, such as, for example, which specific ones of the other communication clients associated with the user 101*a*, the incoming call should be routed to.

In an alternative non-limiting embodiment of the present invention, the network 112 may present an announcement via the active communication session "A" in parallel with sending SIP invite messages to the other communication clients associated with the user 101a (i.e. the communication clients 108b, 108c).

Even though the foregoing description has provided an example of the active communication session "A" and the incoming call each relating to a voice telephony session (i.e. a VoIP call), one skilled in the art will readily appreciate that the type of the active communication session "A" and the incoming call is not particularly limited and may include, but is not limited to, a video communication session, a text messaging communication session, an instant messaging communication session and the like. It should be further understood that teachings of this invention are not limited to media-over-packet or VoIP communication sessions and one skilled in the art can easily adapt the teachings presented herein to other protocols for handling media-over-a-network communications without departing from the spirit of the invention.

Accordingly, by executing the above-described method or any conceivable variant thereof, the network element 112 may connect the incoming call destined for a user associated with a plurality of communication clients registered to a single user account, even in the presence of the active communication session with one of the plurality of communication clients. In the non-limiting example that has been presented above, the network element 112 has connected the incoming call to the communication client 108b while the communication client 108a was engaged in the active communication session "A", both communication clients 108a, 108b being registered in association with a single user account.

Those skilled in the art will appreciate that certain functionality of the network element 112 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the network element 112 and/or other elements may be implemented as an arithmetic and logic unit (ALU) having access to a code memory (not shown) which stores program instructions for the operation of the ALU. The program instructions could be stored on a medium which is fixed, tangible and readable directly by the network element 112 and/or other elements, (e.g., removable diskette, CD-ROM, ROM, fixed disk, USB drive), or the program instructions could be stored remotely but transmittable to the network element 112 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method comprising:
receiving a request for a media-over-packet communication session with a user, the request specifying a user account identifier associated with the user, the user account identifier having been used by a third party to originate the request, a plurality of communication client identifiers being registered to the user account identifier;
responsive to determining absence of an active communication session involving any of the communication client identifiers registered to said user account identifier:
first routing said request to a first set of communication clients using said plurality of communication client identifiers;
responsive to determining existence of an active communication session involving a particular communication client identifier from among the communication client identifiers registered to said user account identifier:
second routing said request to a second set of communication clients using those of said communication client identifiers other than the particular communication client identifier.

2. The method defined in claim 1, further comprising determining if said user account identifier has been provisioned with a call handling feature, wherein said second routing is executed only if said determining if said user account identifier has been provisioned with a call handling feature renders a positive outcome.

3. The method defined in claim 1, wherein said media-over-packet communication session comprises a voice call.

4. The method defined in claim 1, wherein said media-over-packet communication session comprises one of a multimedia call and a video call.

5. The method defined in claim 1, wherein the user account identifier comprises a SIP URI and wherein each of the first and second communication client identifier comprises at least one of an IP address and a sub-address.

6. The method defined in claim 1, wherein said request for a media-over-packet communication session comprises signalling information used for establishing said media-over-packet communication session.

7. The method defined in claim 6, wherein said signalling information comprises a SIP INVFIE message.

8. The method defined in claim 1, further comprising the action of said determining existence of an active communication session involving a particular communication client.

9. The method defined in claim 8, wherein said determining existence of an active communication session involving a particular communication client comprises:
accessing a database, said database mapping user account identifiers with corresponding sets of at least one communication client identifier;
based on said user account identifier, retrieving from said database the first set of communication client identifiers including the particular communication client identifier;
determining that a communication session is in progress with a communication client associated with the particular communication client identifier.

10. The method defined in claim 9, wherein said determining comprises accessing an active call table.

11. The method defined in claim 1, wherein said second routing said request to said second set of communication clients comprises formulating a signalling message destined for said second set of communication clients and releasing said signalling message to said second set of communication clients; said signalling message for causing said second set of communication clients to join said media-over-packet communication session.

12. The method defined in claim 11, wherein said signalling message comprises a SIP INVITE message.

13. The method defined in claim 1, further comprising retrieving at least one call routing condition that has been provisioned in association with said second set of communication clients; and verifying if said at least one call routing condition is satisfied.

14. The method defined in claim 13, wherein said at least one call routing condition is indicative of a period of time when a call handling feature is to be applied.

15. The method defined in claim 13, wherein said at least one call routing condition is indicative of a network identifier associated with an allowed originating party.

16. The method defined in claim 13, wherein said second routing is executed only if said call routing condition is satisfied.

17. The method defined in claim 1, said second set of communication clients including a first communication client and a second communication client, the method further comprising retrieving a first routing condition that has been provisioned in association with said first communication client and a second routing condition that has been provisioned in association with said second communication client.

18. The method defined in claim 17, wherein said routing said request to said second set of communication clients comprises:
routing said request to said first communication client if said first routing condition is satisfied; and
routing said request to said second communication client if said second routing condition is satisfied.

19. The method defined in claim 1, further comprising providing an alert to said particular communication client via said active communication session, said alert indicative of said request.

20. The method defined in claim 19, further comprising soliciting from said particular communication client a disposition instruction; and
wherein said second routing said request is executed at least in part based on said disposition instruction.

21. The method defined in claim 19, wherein said providing an alert and said second routing are performed simultaneously.

22. A network element comprising:
means for receiving a request for a media-over-packet communication session with a user, the request specifying a user account identifier associated with the user, the user account identifier having been used by a third party to originate the request, a plurality of communication client identifiers being registered to the user account identifier;
means for first routing said request to a first set of communication clients using said plurality of communication client identifiers in response to determining absence of an active communication session involving any of the communication client identifiers registered to said user account identifier;
means for second routing said request to a second set of communication clients using those of said communication client identifiers other than a particular communication client identifier from among the communication client identifiers registered to said user account identifier in response to determining existence of an active communication session involving the particular communication client identifier.

23. A system comprising:
network apparatus connectable to a plurality of communication clients over a communication network, the network apparatus being operable:
to receive a request for a media-over-packet communication session with a user, the request specifying a user account identifier associated with the user, the user account identifier having been used by a third party to originate the request, a plurality of communication client identifiers being registered to the user account identifier;
responsive to determining absence of an active communication session involving any of the communication client identifiers registered to said user account identifier:
to first route said request to a first set of communication clients using said plurality of communication client identifiers;
responsive to determining existence of an active communication session involving a particular communication client identifier from among the communication client identifiers registered to said user account identifier:
to second route said request to a second set of communication clients using those of said communication client identifiers other than the particular communication client identifier.

24. The system defined in claim 23, wherein to second route said request to said second set of communication clients, the network apparatus is operable:
to formulate a signalling message destined for said second set of communication clients; and
to release said signalling message to said second set of communication clients;
said signalling message for causing said second set of communication clients to join said media-over-packet communication session.

25. The system defined in claim 23, wherein said signalling message comprises a SIP INVITE message.

26. The system defined in claim 23, wherein the network apparatus is further operable to determine if said user account identifier has been provisioned with a call handling feature, wherein a positive determination that said user account identifier has been provisioned with a call handling feature triggers the network apparatus to second route said request.

27. The system defined in claim 23, where the network apparatus is embodied in a soft switch.

28. The system defined in claim 23, further comprising said communication network.

29. The system defined in claim 23, wherein said media-over-packet communication session comprises a voice call.

30. The system defined in claim 23, wherein said media-over-packet communication session comprises at least one of a multimedia call and a video call.

31. The system defined in claim 23, wherein the user account identifier comprises a SIP URI and wherein each of the first and second communication client identifier comprises at least one of an IP address and a sub-address.

32. The system defined in claim 23, wherein said request for a media-over-packet communication session comprises signalling information used for establishing said media-over-packet communication session.

33. The system defined in claim 32, wherein said signalling information comprises a SIP INVITE message.

34. The system defined in claim 23, wherein the network apparatus is further operable to determine existence of said active communication session involving the particular communication client.

35. The system defined in claim 34, wherein to determine existence of said active communication session involving said particular communication client, the network apparatus is operable:
to access a database, said database mapping user account identifiers with corresponding sets of at least one communication client identifier;
based on said user account identifier, to retrieve from said database the first set of communication client identifiers including the particular communication client identifier;
to determine communication session is in progress with a communication client associated with the particular communication client identifier.

36. The system defined in claim 35, wherein to determine if said at least one active communication session is in progress, the network apparatus is operable to access an active call table.

37. The system defined in claim 36, wherein the network apparatus comprises said active call table.

38. The system defined in claim 36, further comprising said active call table, wherein said active call table is accessible to and is under control of the network apparatus.

39. The system defined in claim 23, wherein the network apparatus is further operable to retrieve at least one call routing condition that has been provisioned in association with said second set of communication clients; and to verify if said at least one call routing condition is satisfied.

40. The system defined in claim 39, wherein said at least one call routing condition is indicative of a period of time when a call handling feature is to be applied.

41. The system defined in claim 39, wherein said at least one call routing condition is indicative of a network identifier associated with an allowed originating party.

42. The system defined in claim 39, wherein a positive determination that said call routing condition is satisfied triggers the network apparatus to second route said request.

43. The system defined in claim 23, said second set of communication clients including a first communication client and a second communication client, wherein the network apparatus is further operable to retrieve a first routing condition that has been provisioned in association with said first communication client and a second routing condition that has been provisioned in association with said second communication client.

44. The system defined in claim 43, wherein to second route said request, the network apparatus is operable to route said request to said first communication client if said first routing condition is satisfied; and wherein the network apparatus is further operable to route said request to said second communication client if said second routing condition is satisfied.

45. The system defined in claim 23, wherein the network apparatus is further operable to provide an alert to said particular communication client via said active communication session, said alert indicative of said request.

46. The system defined in claim 45, wherein the network apparatus is further operable to solicit from said particular communication client a disposition instruction; and wherein to route said request, the network apparatus is operable to route said request at least in part based on said disposition instruction.

47. The system defined in claim 45, wherein the network apparatus is operable to provide an alert to said particular communication client and to route said request at the same time.

48. The system defined in claim 23, further comprising said communication clients.

49. The system defined in claim 48, wherein said first communication client is embodied in one of a media-over-packet telephone, a Plain Old Telephone System (POTS) telephone equipped with an Analog Terminal Adapter (ATA) and a computing apparatus executing a soft client;
and wherein said second set of communication clients is embodied in one of a media-over-packet telephone, a POTS telephone equipped with an ATA and a computing apparatus executing a soft client.

50. A non-transitory computer-readable medium comprising computer-readable program code which, when executed by a computing apparatus, causes the computing apparatus:
to receive a request for a media-over-packet communication session with a user, the request specifying a user account identifier associated with the user, the user account identifier having been used by a third party to originate the request, a plurality of communication client identifiers being registered to the user account identifier;
responsive to determining absence of an active communication session involving any of the communication client identifiers registered to said user account identifier:
to first route said request to a first set of communication clients using said plurality of communication client identifiers;
responsive to determining existence of an active communication session involving a particular communication client identifier from among the communication client identifiers registered to said user account identifier:
to second route said request to a second set of communication clients using those of said communication client identifiers other than the particular communication client identifier.

* * * * *